(12) United States Patent
Song et al.

(10) Patent No.: US 6,646,796 B2
(45) Date of Patent: Nov. 11, 2003

(54) WIDE BAND ERBIUM-DOPED FIBER AMPLIFIER (EDFA)

(75) Inventors: Kwan-Woong Song, Seoul (KR); Seong-Taek Hwang, Kyunggi-do (KR)

(73) Assignee: Samsung Electronics Co., LTD, Suwon (KR)

( * ) Notice: Subject to any disclaimer, the term of this patent is extended or adjusted under 35 U.S.C. 154(b) by 0 days.

(21) Appl. No.: 09/870,599

(22) Filed: May 31, 2001

(65) Prior Publication Data

US 2002/0181091 A1 Dec. 5, 2002

(51) Int. Cl.$^7$ .................................................. H01S 3/00
(52) U.S. Cl. ....................................................... 359/349
(58) Field of Search ........................ 359/341.42, 337.4, 359/349

(56) References Cited

U.S. PATENT DOCUMENTS

| | | | | |
|---|---|---|---|---|
| 5,838,487 A | * | 11/1998 | Nilsson et al. | 359/133 |
| 5,867,306 A | * | 2/1999 | Isshiki | 359/337.1 |
| 6,049,417 A | | 4/2000 | Srivastava et al. | 359/341 |
| 6,049,418 A | | 4/2000 | Srivastava et al. | 359/341 |
| 6,259,556 B1 | * | 7/2001 | Lutz et al. | 359/160 |
| 6,304,370 B1 | * | 10/2001 | Barnard | 359/341.1 |
| 6,307,668 B1 | * | 10/2001 | Bastien et al. | 359/337.1 |
| 6,424,459 B1 | * | 7/2002 | Yokota | 359/341.42 |
| 6,437,907 B1 | * | 8/2002 | Yoon et al. | 359/341.32 |
| 6,480,328 B2 | * | 11/2002 | Shimojoh | 359/341.1 |

FOREIGN PATENT DOCUMENTS

| JP | 20022261363 | * | 9/2002 | H01S/3/10 |
|---|---|---|---|---|

OTHER PUBLICATIONS

Sun; et al. 80nm Ultra–Wideband Erbium–Doped Silica Fibre Ampifier; Electronics Letters, Nov. 6, 1997, vol. 33 No. 23, pp. 1965–1967.

Sun; et al. "A Gain–Flattened Ultra Band EDFA for High Capacity WDM Optical Communications Systems"; ECOC '98, 9/20–24/98; Madrid, Spain, pp. 53–54.

Sun; et al. "An 80 nm Ultra Wide Band EDFA with Low Noise Figure and High Output Power"; ECOC 97, 9/22–25/97, Conference Publication No. 448, IEE, 1997, pp. 69–72.

* cited by examiner

Primary Examiner—Thomas G. Black
Assistant Examiner—Deandra Hughes
(74) Attorney, Agent, or Firm—Cha & Reiter

(57) ABSTRACT

The proposed amplifier structure and associated method of optical signal amplification efficiently utilizes the limited length of rare earth-doped optical amplifier. A multi-stage of amplification stages, which includes a first erbium-doped fiber amplifier stage pumped by a first pump light source and a second erbium-doped fiber amplifier stage pumped by a second pump light source, is provided and includes a split section disposed between the first and second amplification stages for splitting the amplified signal light into a C-band and a L-band; a reflector for reflecting the amplified output of the second amplifier stage back into the second amplifier stage and the first amplifier stage in a reverse direction; a combiner for combining the reflected output, in succession, from the second amplifier and first amplifier to produce an output signal; and, a circulator for redirecting the reflected output traveling in a reverse direction to the input of the combiner.

23 Claims, 6 Drawing Sheets

| STRUCTURE(S) | 22dB GAIN BAND WIDTH(nm) | PUMP POWER AT EDF$_2$(mW) | EDF$_2$ LENGTH(m) |
|---|---|---|---|
| PRIOR ART | 78 | 111 | 188 |
| INVENTIVE STRUCTURE | 71 | 13 | 85 |

*FIG. 6*

WIDE BAND ERBIUM-DOPED FIBER AMPLIFIER (EDFA)

BACKGROUND OF THE INVENTION

1. Field of the Invention

The present invention relates to optical communications systems and, in particular, to a wide band optical amplifier.

2. Description of the Related Art

In general, fiber amplifiers are crucial elements for high-performance fiber-optic communications systems and networks. The ability to directly amplify optical signals, without converting them to some other form for processing, is highly desirable for communications. Various designs of silica-based earth-doped optical fibers, i.e., erbium-doped fiber amplifiers (EDFAs), have been employed to amplify optical signals in communication systems. Increasing the EDFA gain bandwidth increases the system capacity. Complex techniques are used to achieve a wide gain in the conventional wavelength range between 1530 nm–1560 nm (hereinafter referred to as "C-band") and the long wavelength range between 1570 nm–1610 nm (hereinafter referred to as "L-band") for the wavelength-division-multiplexed (WDM) transmission system.

FIG. 1 illustrates a schematic view of conventional broadband EDFA, which are capable of producing a broad optical bandwidth. Basically, the conventional EDFA is divided into two amplification sections. The input signals are split into two sub-bands, the C-band and the L-band are amplified independently. Then, the amplified signals are recombined afterwards to produce an output signal. FIG. 2 illustrates the output power spectrum and the noise figure spectra of the prior art system of FIG. 1. Here, the gain is produced by an erbium-doped silica fiber.

As shown in FIG. 1, the L-band fiber amplifier typically requires a much longer length of EDFs (188 m) and more power pumps as the power inversion has typically been lower than that observed in C-band EDFAs. Thus, the installation of the prior art system is not cost-effective due to longer EDFAs and higher pump power requirements. Accordingly, there is a need for a cost-effective optical power amplifier with improved power conversion efficiency.

SUMMARY OF THE INVENTION

The present invention is directed to an optical amplifier with a structure that efficiently utilizes erbium-doped fiber amplifiers (EDFAs) and the associated pump source, and as a consequence provides an increased signal bandwidth using much shorter erbium-doped fibers (EDFs) and less light pump power.

Accordingly, the inventive optical fiber includes a first erbium-doped fiber amplification stage being pumped by a first pump light source; a second erbium-doped fiber amplifier stage being pumped by a second pump light source; a split section disposed between the first and second amplification stages for splitting the amplified signal light into a first sub-band and a second sub-band, a reflector for reflecting the amplified output of the second amplifier stage back into the second amplifier stage in a reverse direction; a combiner for combining the reflected output, in succession, from the second amplifier and first amplifier to produce an output signal; and, a circulator for redirecting the reflected output traveling in a reverse direction to the input of the combiner.

The method of amplifying optical signals having two or more optical bands includes the steps of: passing input optical signals through a first amplifier stage; splitting the amplified input signals into a C-band and L-band signals; further amplifying the L-band signal in a second amplifier stage; redirecting the amplified L-band again back into the second amplifier stage in a reverse direction; and, recombining the redirected L-band and the C-band to produce an output signal.

The foregoing and other features and advantages of the invention will be apparent from the following, more detailed description of preferred embodiments as illustrated in the accompanying drawings in which reference characters refer to the same parts throughout the various views. The drawings are not necessarily to scale, the emphasis instead is placed upon illustrating the principles of the invention.

DETAILED DESCRIPTION OF THE INVENTION

In the following description, for purposes of explanation rather than limitation, specific details are set forth such as the particular architecture, interfaces, techniques, etc., in order to provide a thorough understanding of the present invention. However, it will be apparent to those skilled in the art that the present invention may be practiced in other embodiments, which depart from these specific details. For the purpose of simplicity and clarity, detailed descriptions of well-known devices and methods are omitted so as not to obscure the description of the present invention with unnecessary detail.

Figure 3:
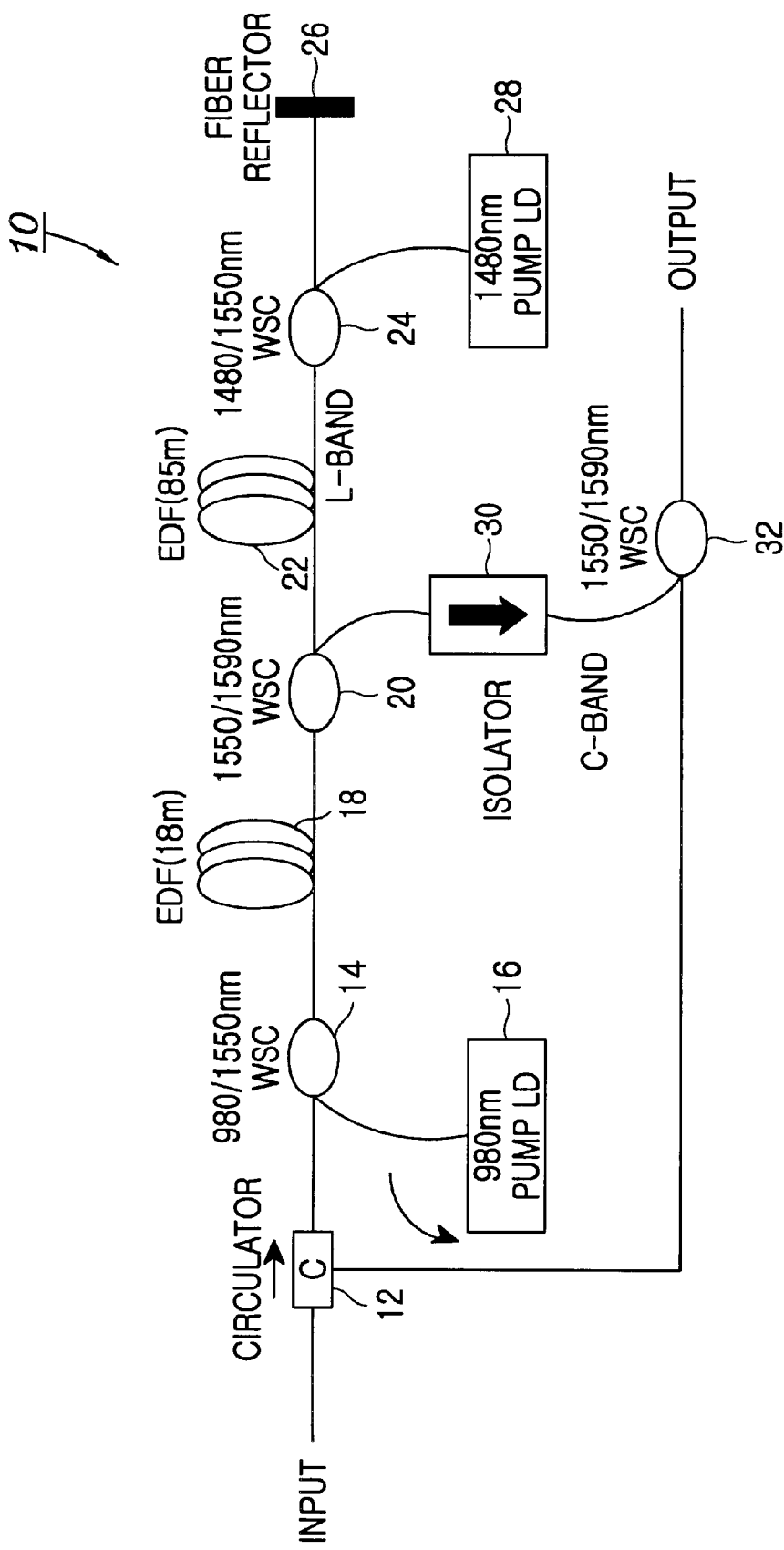
FIG. 3 is a schematic view of a wide band EDFA according to a first embodiment of the present invention.

FIG. 3 is a schematic view illustrating the components of a wide band optical amplifier 10 according to a first embodiment of the present invention. Basically, the inventive amplifier 10 is divided into two amplifier sections, first amplification and second amplification stages. The first amplification stage includes a first erbium-doped coil of fiber 18 for amplifying the input optical signals of both the C-band and L-band, and a second amplification includes a second erbium-doped coil of fiber 22 for amplifying the L-band. The C-band ranges from 1530 nm to 1560 nm, and the L-band ranges from 1570 nm to 1600 nm. It should be noted that these ranges are implementation-dependent, thus they may vary depending upon the design and erbium-doped fiber (EDF).

Major components of the wide band optical amplifier 10 according to the first embodiment of the present invention include a circulator 12; a 980 nm pump laser diode 16 coupled to a 980/1550 nm wavelength selective coupler (WSC) 14; an erbium-doped fiber (EDF) 18; a first 1550/1590 nm WSC 20; a second EDF 22; a backward 1480 m pump laser diode 28 coupled to a 1480/1550 nm WSC 24; a reflector 26; an isolator 30; and, a second 1550/1590 nm WSC 32. These components of the inventive amplifier 10 are generally known and commercially available. Although the length of erbium-doped fibers (EDFs) is shown in FIG. 3 for illustrative purposes, it is to be understood that the inventive amplifier 10 can support a different length of EDF. Thus, the length of EDF in the drawing should not impose limitations on the scope of the invention.

In operation, optical signals passing through the circulator 12 and propagating in the forward direction are amplified by the first EDF 18, which is pumped with a 980 nm diode laser 16 via the 980/1550 nm WSC 14, prior to splitting. The pump LD 16 preferably emits a pump wavelength in a wavelength band centered at about 980 nm; however, 1480 nm pumping is also suitable, as those skilled in the art will appreciate as the conventional pump wavelength for EDFAs. The length of the first amplifier stage is preferably≧18 meters, and when pumped with light from the pump source 16 such that some of the pump light is absorbed in the first amplification stage. Thereafter, the amplified signals are then split into two sub-bands, the C-band and the L-band, through action of the first 1550/1590 nm WSC 20. Those skilled in the art will appreciate that the first WSC 20 can take the form of a grating, band splitter, thin film filter, WDM device, and other components suitable for reflecting or redirecting one or more band of wavelengths. The splitted C-band signals are forwarded toward the isolator 30. The function of the isolator 30 is to permit light to pass through in only one direction, thus preventing any reflections in the first WSC 20. Meanwhile, the L-band signals pass forwardly through the second amplification stage of the second EDF 22, which is pumped with a 1480 nm diode laser 28 via the 1480/1550 nm WSC 24. The pump 28 preferably emits a pump wavelength in a wavelength band centered at about 1480 nm, however 980 nm pumping is also suitable, as those skilled in the art will appreciate as the conventional pump wavelength for EDFAs. The length of the second amplifier stage is preferably≧85 meters, and when pumped with light from the pump source 28 such that some of the pump light is absorbed in the second amplification stage.

Thereafter, the amplified L-band signals traveling in the forward direction are reflected by the fiber reflector 26 and redirected back into the second amplification stage. At this time, the forward C-band amplified spontaneous emission (hereinafter ASE) generated at the second amplifier stages is also reflected by the fiber reflector 26 in a reverse direction. The reflected L-band and C-band ASE are directed back into the second amplifier stage through the second EDF 22 for further amplification. The reverse C-band ASE is blocked by the first WSC 20 and the remaining reversely amplified L-band pass through, in sucession, the first WSC 20, the first EDF 18, the 980/1550 nm WSC 14, the circulator 12 in order, and finally arrive at the input of the second 1550/1590 WSC 32. Hence, when the reflected light is further amplified through the reverse amplification process, the present invention effectively pumps the L-band of the erbium-gain spectrum of the second amplification stage, resulting in a wide signal gain bandwidth. The reflected L-band is recombined with the C-band that is outputted from the isolator 30 in the second WSC 32 to produce an output signal.

The key features of the inventive amplifier 20 are a high gain produced by multiple stages, a high pumping efficiency, thus requiring less EDF power pump components. This result is accomplished through the ability of further amplifying signals in the reverse direction, as described in the preceding paragraphs. When the L-band passes through multiple amplification stages due to the reflector 26 and enhances the output power of this sub-band, a high gain of more than 20 dB may be achieved.

Figure 4:
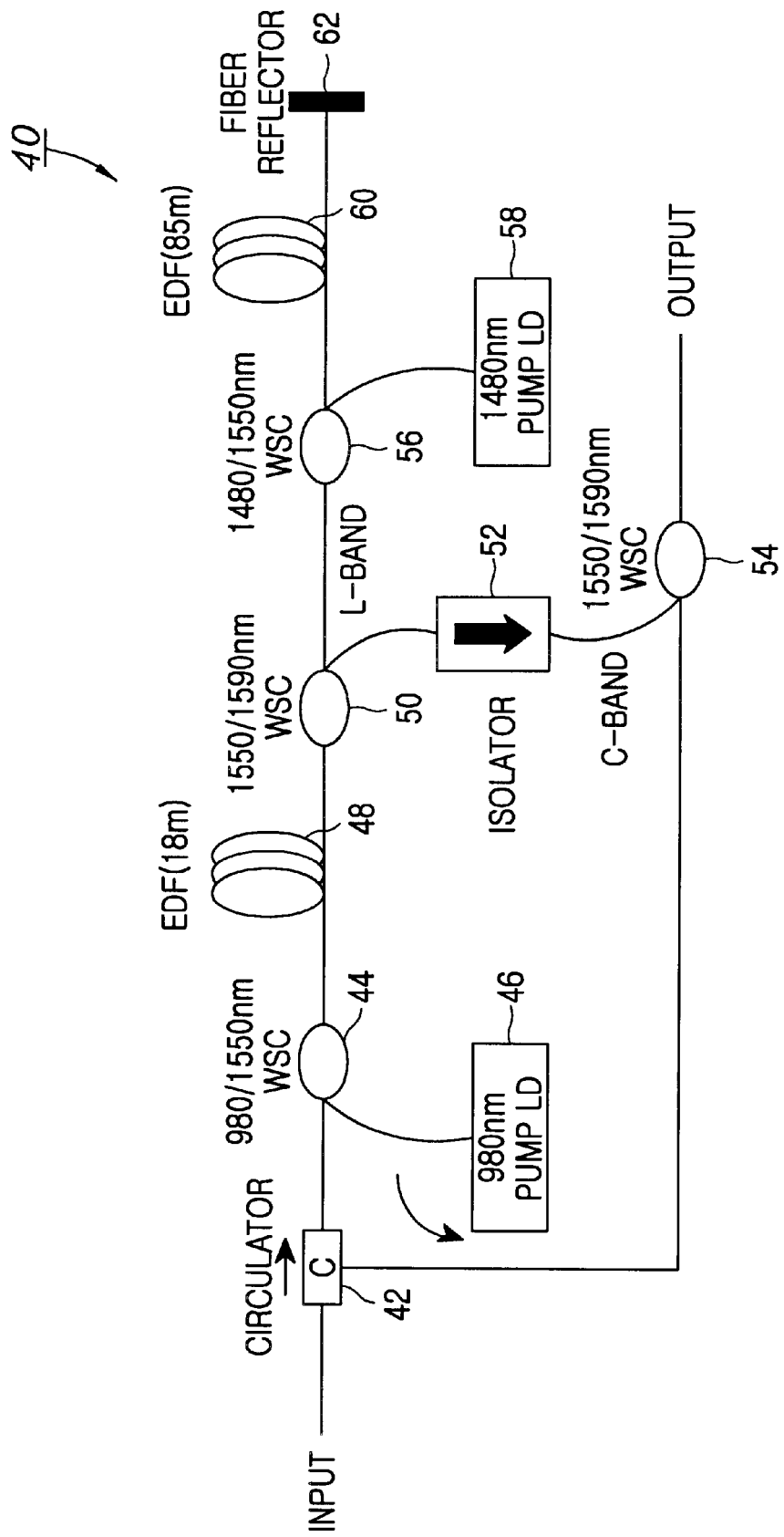
FIG. 4 is a schematic view of a wide band EDFA according to a second embodiment of the present invention.

In another embodiment, a wide band amplifier structure illustrating the principles of the present invention is shown schematically in FIG. 4. The construction and operation of the second embodiment are essentially the same as that described above with respect to FIG. 3. The only notable difference is that a forward pumping is used in the second amplifier stage.

Referring to FIG. 4, the wide band optical amplifier 40 according to a second embodiment of the present invention includes a circulator 42; a 980 nm pump laser diode 46 coupled to a 980/1550 nm wavelength selective coupler (WSC) 44; an erbium-doped fiber (EDF) 48; a first 1550/1590 nm WSC 50; an isolator 52; a second 1550/1590 WSC 54; a 1480 pump laser diode 58 coupled to a 1480/1550 nm WSC 56; a second EDF 60; and, a reflector 62. The length of respective erbium-doped fibers (EDFs) is shown in FIG. 4 for illustrative purposes. However, it is to be understood that the inventive amplifier 10 can support a different length of EDF. Thus, the length of EDF in the drawing should not impose limitations on the scope of the invention. In addition, the discussion of similar components described with reference to FIG. 4 is omitted to avoid redundancy, as they are described with respect to FIG. 3.

In the embodiment, the input optical signals propagating forwardly through the circulator 42 are amplified by the first EDF 48, which is pumped with a 980 nm diode laser 46 coupled to the 980/1550 nm WSC 44. Then, the amplified light is split into two sub-bands, the C-band and the L-band, through action by the first 1550/1590 nm WSC 50. The reflected C-band travels forwardly through the isolator 52, which permits the light to pass through in only one direction and prevents any reflections from the first 1550/1590 WSC 50. Meanwhile, the L-band continues to pass forwardly through the second EDF 60, which is pumped with a 1480 nm diode laser 58 that is coupled to the 1480/1550 nm WSC 56. Thereafter, the amplified L-band and the forward C-band ASE generated at the EDP 60 are received and reflected by the fiber reflector 62 in a reverse direction. The reflected L-band and C-band ASE (i.e., opposite direction of pump light propagation from the pump source 58) travel back into the second amplification stage. Then, the 1480 pump laser diode 58 further amplifies the reflected L-band traveling in a reverse direction with the reflected C-band ASE received thereon. The reversely amplified L-band is even further amplified by the 980 nm pump LD 46 when traveling in the first amplification stage in a reverse direction. Finally, the reversely amplified light is redirected by the circulator 42 toward the WSC 54 and recombined with the C-band output from the isolator 52 to produce an output signal.

Figure 1:
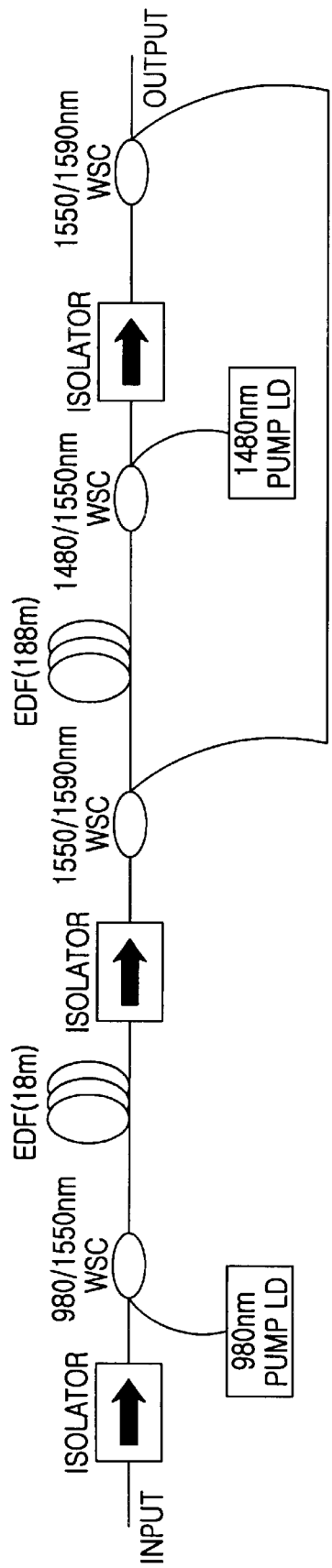
FIG. 1 illustrates an erbium-doped fiber amplifier (EDFA) according to a prior art system.
Figure 2:
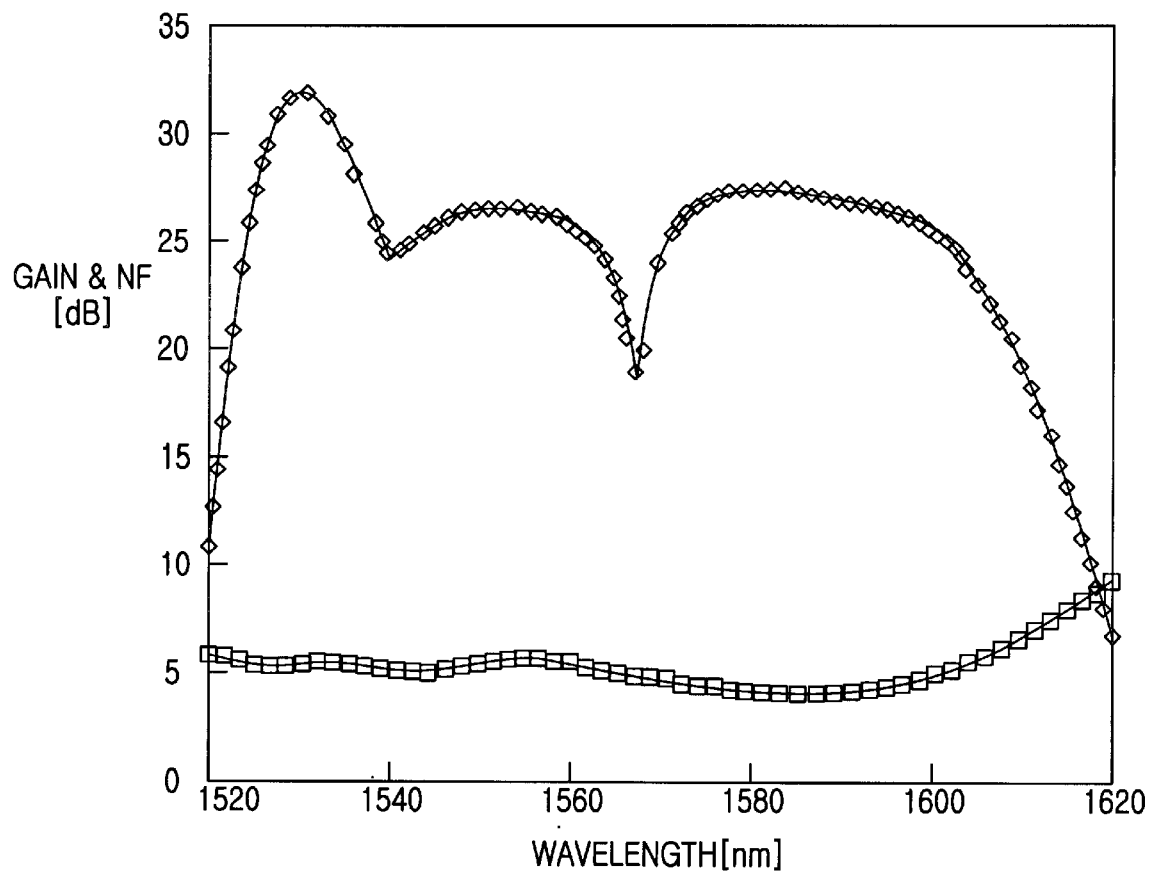
FIG. 2 is a plot of gain and noise figure (dB) vs. wavelength (nm) resulting from an experimental result of the optical fiber amplifiers depicted in FIG. 1.
Figure 5:
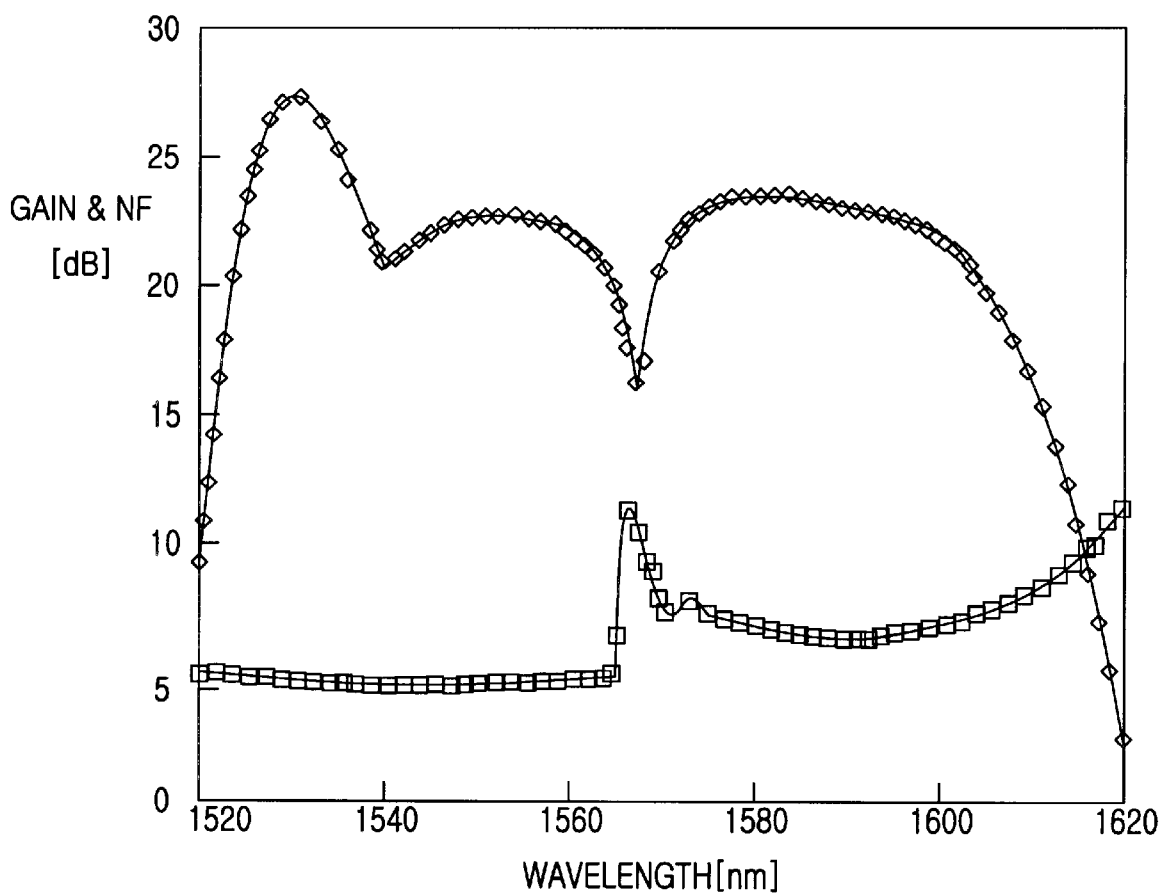
FIG. 5 is a plot of gain and noise figure (dB) vs. wavelength (nm) resulting from an experimental result of the wide band EDFA according to the embodiment of the present invention; and, FIG. 6 is a comparison table illustrating the output power between the prior art structure and the inventive structure.

A working experiment was performed using the inventive wide band optical amplifier structures of FIGS. 3 and 4. FIG. 5 represents a plot of gain and noise figure (dB) vs. wavelength (nm) resulting from a numerical simulation of the wide band EDFA according to the embodiment of the present invention. For experiment, a set of two EDFs, 18 meters and 85 meters, were used for amplification. A first pump laser 16 operating at 980 nm for the C-band and the L-band and a second pump laser 28 operating at 1480 nm for the L-band were used. The gain bandwidth and the used pump power for the inventive structures of FIGS. 3 and 4 and the prior art structure of FIG. 1, resulting from the experiment, are shown in FIG. 6. From FIG. 6, it can be seen that a similar gain bandwidth was achieved using much lower pump power and shorter EDFs. From this result, it can be seen that the inventive structure was able to obtain the similar gain goal as in the prior art system but in a much more cost-effective way.

While the preferred embodiments of the present invention have been illustrated and described, it will be understood by those skilled in the art that various changes and modifications may be made, and equivalents may be substituted for elements thereof without departing from the true scope of the present invention. For example, the principles of the present invention are applicable to other rare earth-doped optical amplifiers, i.e., thulium-doped fiber or hybrids such as oxyhalide active fibers. Many modifications may be made, such as incorporating a bi-directional power pump in both the first and second amplification stages. Therefore, it is intended that the present invention not be limited to the particular embodiment disclosed as the best mode contemplated for carrying out the present invention; instead, it is intended that the present invention include all embodiments falling within the scope of the appended claims.

What is claimed is:

1. A wide band optical amplifier, comprising:
a first erbium-doped fiber amplifier stage ($S_1$) pumped by a first pump light source;
a second erbium-doped fiber amplifier stage ($S_2$) pumped by a second pump light source;
a split section disposed between said first $S_1$ said second $S_2$ for amplified signal light that enter said split section into a first sub-band and a second sub-band, wherein said second sub-band is forwarded to said $S_2$;
a reflector for reflecting the amplified output of said $S_2$ back into said second $S_2$ and said first $S_1$ in a reverse direction; and,
a combiner for combining said reflected output from said second $S_2$ and said first $S_1$ and said first sub-band to produce an output signal.

2. The amplifier of claim 1, further comprising a circulator for redirecting said reflected output from said second $S_2$ and said first $S_1$ traveling in a reverse direction to the input of said combiner.

3. The amplifier of claim 1, further comprising an isolator for forwardly directing said first sub-band to the input of said combiner.

4. The method of claim 1, said first pumping light source is in one of a forward traveling and a backward traveling direction with respect to a direction of amplified signal light.

5. The method of claim 1, said second pumping light source is in one of a forward and a backward traveling direction with respect to a direction of amplified signal light.

6. The amplifier of claim 1, wherein said second pump light source provides an amount of amplified spontaneous emission (ASE) traveling in a forward direction, said forward ASE providing excitation light for said second $S_2$ when reflected by said reflector.

7. The amplifier of claim 1, wherein said first pump light source provides an amount of amplified spontaneous emission (ASE) traveling in a forward direction, said forward ASE providing excitation light for said first $S_1$.

8. The amplifier of claim 1, wherein the pump light generated by said first pump light source is in a wavelength band centered at about 980 nm.

9. The amplifier of claim 1, wherein the pump light generated by said second pump light source is in a wavelength band centered at about 1480 nm.

10. The method of claim 1, wherein the length of the second erbium-doped fiber of said $S_2$ is substantially greater than the first erbium-doped fiber of said $S_1$.

11. A wide band optical amplifier, comprising:
a first erbium-doped fiber amplifier stage ($S_1$) having an input and an output;
a first pump light source coupled to the input of said first $S_1$ for introducing a pump light;
a second erbium-doped fiber amplifier stage ($S_2$) having an input and an output;
a second pump light source coupled to the input of said $S_2$ for introducing a pump light;
a split section disposed between said first $S_1$ and said second $S_2$ wherein an amplified signal light that enters said split section is split into a plurality of sub-band signals;
a reflector for reflecting the amplified output signal from said $S_2$ in a reverse traveling direction back into said second $S_2$ and said first $S_1$;
a combiner for combining said reversely reflected amplified output signals and one of said sub-band signals output from said split section into an output signal; and,
a circulator for forwardly passing input optical signals and for redirecting said reversely reflected amplified output signals to the input of said combiner.

12. The amplifier of claim 11, wherein the output of said $S_1$ is coupled to the input of said second $S_2$.

13. The amplifier of claim 11, further comprising an isolator for directing one of said sub-band signal outputs from said split section to the input of said combiner.

14. The amplifier of claim 11, said first pumping light source is in one of a forward traveling and a backward traveling direction with respect to a direction of an amplified signal light.

15. The amplifier of claim 11, said second pumping light source is in one of a forward traveling and a backward traveling direction with respect to a direction of an amplified signal light.

16. The amplifier of claim 11, wherein an amount of forward amplified, spontaneous emission (ASE) generated in said second $S_2$ and reflected by said reflector in a reverse direction provides excitation light for said second $S_2$.

17. The amplifier of claim 11, wherein the pump light generated by said first pump light source is in a wavelength band centered at about 980 nm.

18. The amplifier of claim 11, wherein the pump light generated by said second pump light source is in a wavelength band centered at about 1480 nm.

19. The amplifier of claim 1, wherein the length of the second erbium-doped fiber of said $S_2$ is substantially greater than the first erbium-doped fiber of said $S_1$.

20. A method of amplifying optical signals having two or more optical bands, the method comprising the steps of:
(a) passing input optical signals through a first amplifier stage ($S_1$);
(b) splitting said amplified input signals into a C-band and L-band signals;
(c) further amplifying said L-band signal in a second amplifier stage ($S_2$);
(d) redirecting said amplified L-band again back into said second $S_2$ and said first $S_1$ in a reverse direction;
(e) amplifying said redirected L-band in said second $S_2$ and said first $S_1$; and,
(f) recombining said redirected L-band and said splitted C-band to produce an output signal.

21. The method of claim 20, wherein said C-band ranges substantially from 1530 nm to 1560 nm.

22. The method of claim 20, wherein said L-band ranges substantially from 1570 nm to 1600 nm.

23. The method of claim 20, where in said step (d) comprises the step of redirecting an amount of forward ASE back into said second $S_2$ for amplification.

* * * * *